March 17, 1953 J. L. MERRILL, JR 2,632,051

BALANCING NETWORK FOR LOADED TRANSMISSION LINES

Filed Aug. 30, 1949

INVENTOR
J. L. MERRILL JR.
BY
Ralph T. Holcomb
ATTORNEY

Patented Mar. 17, 1953

2,632,051

UNITED STATES PATENT OFFICE 2,632,051

BALANCING NETWORK FOR LOADED TRANSMISSION LINES

Josiah L. Merrill, Jr., Port Washington, N. Y., assignor to Bell Telephone Laboratories, Incorporated, New York, N. Y., a corporation of New York Application August 30, 1949, Serial No. 113,073

3 Claims. (Cl. 178—44)

This invention relates to wave transmission networks and more particularly to a network for balancing a loaded transmission line.

The principal object of the invention is to simulate the characteristic impedance of a periodically loaded transmission line terminated at any point in the section. Further objects are to provide a balancing network which will closely match the line impedance over the greater portion of the transmission band but at frequencies above this range will have a resistance component not materially exceeding that of the line.

Wave transmission systems often require, for balancing purposes, two-terminal network which will closely simulate the characteristic impedance of an actual line over the major part of the transmission band. In certain applications such, for example, as in connection with negative-impedance repeaters, it is a further requirement that the resistive component of the balancing network shall not materially exceed that of the line at frequencies above the matching range, in order to prevent singing.

The present invention provides, in a comparatively simple structure, such a balancing network for a periodically loaded transmission line with any fractional end section. A basic network section comprising a resistance shunted by the series combination of an inductance and a capacitance is designed to balance approximately the characteristic impedance of the line when terminated at 0.2 loading coil. This basic network is then built out to full loading coil by the addition of a series inductance. In order to balance a line terminated in any fractional section, a shunt building-out capacitance is added to the network. The component elements of the network are evaluated in terms of the inductance of the loading coil and the capacitance and characteristic impedance of the line to be balanced. These elements may, if desired, be made variable so that the network can be readily adjusted for operation with a selected transmission line or a particular end section.

Figure 1:
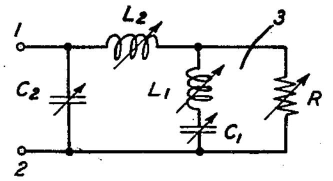
Figure 2:
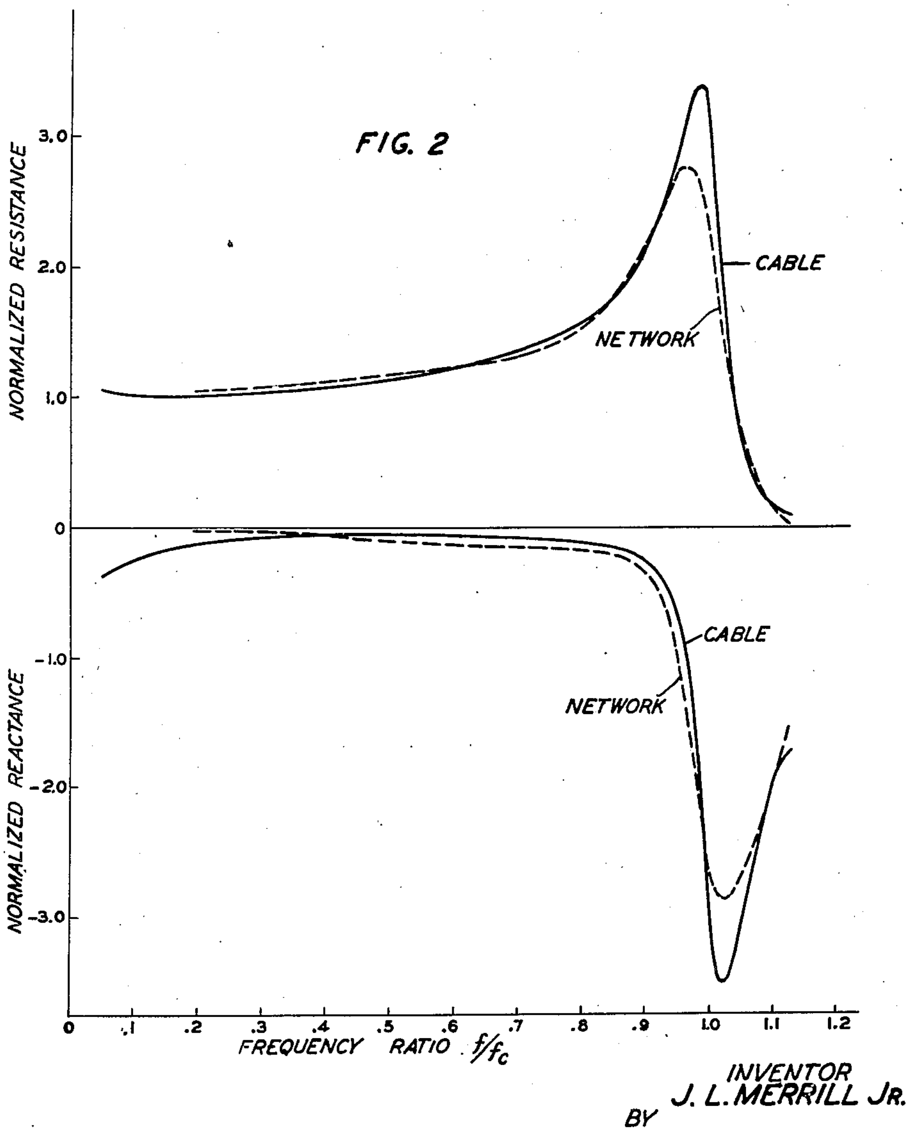

The nature of the invention will be more fully understood from the following detailed description and by reference to the accompanying drawing, in which:

Fig. 1 is a schematic circuit of a balancing network in accordance with the invention; and Fig. 2 compares the normalized impedance-frequency characteristic of a typical network with that of the actual line it is designed to balance.

In the embodiment of the balancing network shown in Fig. 1, the basic network section 3 comprises a resistance R shunted by the series combination of an inductance $L_1$ and a capacitance $C_1$. The basic section 3 is designed to simulate approximately the characteristic impedance, as viewed at 0.2 loading coil, of the periodicaly loaded transmission line to be balanced. The network is then built out to full coil by the addition of the inductance $L_2$ in series between the basic section 3 and one of the terminals 1. The network may, if desired, be built out to any fractional section termination X by means of the building-out capacitance $C_2$ connected between the terminals 1 and 2.

In order for the network to provide good impedance simulation over the frequency range lying between 0.2 and 0.9 of the cut-off frequency $f_c$ of the line, and have a resistive component above $0.9f_c$ which does not materially exceed that of the line, the resistance R is made approximately equal to the resistive component of the mid-section characteristic impedance of the loaded line at $0.2f_c$ and the other component elements are evaluated approximately as follows:

$$C_1=0.25C \quad (1)$$

$$C_2=XC \quad (2)$$

$$L_1=0.69L \quad (3)$$

$$L_2=0.83L \quad (4)$$

where C is the capacitance of the line per section, L is the inductance of each of the loading coils with which the line is loaded, and X is the fractional part of a full section corresponding to the end section.

It is noted that the impedance $L_2$ is not made equal to 0.8L, as might be expected from the explanation given above, but is made slightly larger. This is done in order to get the best possible impedance match over a considerable range of fractional section terminations.

The elements may be made variable, as indicated by the arrows, in order to facilitate adjustment of the balancing network for use with different line facilities, or with different end sections, as required.

The network may, of course, be readily adapted to provide an impedance which is equal to some factor K times the impedance of a given transmission line. Such an impedance may, for example, be encountered when a line is viewed through a transformer which provides an impedance transformation equal to K. In this case, the resistance R and the inductances $L_1$ and $L_2$ are multiplied by K and the capacitances $C_1$ and $C_2$ are divided by K.

The curves in Fig. 2 show the impedance-frequency characteristics of a typical loaded exchange cable at mid-section ($X=0.5$) and a balancing network designed in accordance with the invention for this facility. The frequencies are normalized with respect to the cut-off frequency $f_c$ and both the resistive and the reactive components of the impedances are normalized with respect to the resistive component of the cable at $0.2f_c$. It is seen that in both resistance and reactance the impedance of the network (broken-line curves) simulates that of the cable (solid-line curves) quite closely over the frequency range from $0.2f_c$ to $0.95f_c$, and that at frequencies above $0.95f_c$ the resistive component of the network does not materially exceed that of the cable.

What is claimed is:

1. A balancing network for simulating, over the major part of the transmission band, the characteristic impedance of a transmission line periodically loaded with coils each of inductance L, having a capacitance C per section, and terminated in a fractional end section, comprising an inductance $L_2$ and a resistance connected in series between a pair of terminals, the series combination of an inductance $L_1$ and a capacitance $C_1$ connected in shunt with said resistance, and a capacitance $C_2$ connected between said terminals, said resistance being approximately equal to the resistive component of the mid-section characteristic impedance of said line at 0.2 of the cut-off frequency, $C_2$ being approximately equal to the capacitance of said end section, the other component elements having approximately the following values:

$$C_1=0.25C$$
$$L_1=0.69L$$
$$L_2=0.83L$$

and said network having a resistive component not materially exceeding that of said line at frequencies above the matching range.

2. A network in accordance with claim 1 in which said capacitances, inductances, and resistance are variable.

3. A balancing network for simulating, over the major part of the transmission band, an impedance equal to K times the characteristic impedance of a transmission line periodically loaded with coils each of inductance L, having a capacitance C per section, and terminated in a fractional end section, comprising an inductance $L_2$ and a resistance connected in series between a pair of terminals, the series combination of an inductance $L_1$ and a capacitance $C_1$ connected in shunt with said resistance, and a capacitance $C_2$ connected between said terminals, said resistance being approximately equal to K times the resistive component of the mid-section characteristic impedance of said line at 0.2 of the cut-off frequency, $C_2$ being approximately equal to the capacitance of said end section divided by K, the other elements having approximately the following values:

$$C_1=0.25C/K$$
$$L_1=0.69KL$$
$$L_2=0.83KL$$

and said network having a resistive component not materially exceeding K times that of said line at frequencies above the matching range.

JOSIAH L. MERRILL, JR.

REFERENCES CITED

The following references are of record in the file of this patent:

UNITED STATES PATENTS

| Number | Name | Date |
|---|---|---|
| 1,437,422 | Hoyt | Dec. 5, 1922 |
| 2,217,957 | Lewis | Oct. 15, 1940 |
| 2,398,691 | Bradley | Apr. 16, 1946 |

FOREIGN PATENTS

| Number | Country | Date |
|---|---|---|
| 95,075 | Sweden | Mar. 15, 1939 |

OTHER REFERENCES

Hoyt: "Impedance of Loaded Lines, and Design of Simulating and Compensating Networks," The Bell System Technical Journal, July 1924, vol. III, No. 3, pages 443–450.

Book: Communication Networks, vol 2, by Guillemin, John Wiley and Sons, Inc., 1935.